United States Patent [19]

Im

[11] Patent Number: 4,550,906

[45] Date of Patent: Nov. 5, 1985

[54] BICYCLE TYPE EXERCISE APPARATUS WITH INDEXING PEDAL CRANKS

[76] Inventor: Darryl Im, 3041 Via Mondo, Compton, Calif. 90221

[21] Appl. No.: 466,882

[22] Filed: Feb. 16, 1983

[51] Int. Cl.⁴ .................. A63B 21/22; A63B 23/04
[52] U.S. Cl. ........................................ 272/73; 403/1; 403/97
[58] Field of Search .............. 272/73; 74/594.1, 594.3; 403/1, 4, 97, 286

[56] References Cited

U.S. PATENT DOCUMENTS

| | | | |
|---|---|---|---|
| 2,783,044 | 2/1957 | Sbarra | 272/73 X |
| 3,062,543 | 11/1962 | Shaboo | 272/73 X |
| 3,213,852 | 10/1965 | Zent | 272/73 X |
| 4,163,486 | 8/1979 | Kagata | 403/1 |

Primary Examiner—Richard J. Johnson
Attorney, Agent, or Firm—Boniard I. Brown

[57] ABSTRACT

Exercise apparatus which includes pedaling apparatus carried on a frame, the pedaling apparatus including a first pedal on a crank arm fixed to a first shaft rotatably mounted on the frame, a second pedal on a second crank arm fixed to a second shaft rotatably mounted on the frame, both shafts having a common axis, and means for the selective angular indexing of the first crank arm relative to the second crank arm between at least a first position in which both crank arms are disposed in the same angular orientation and a second position in which the first and second crank arms extend in opposite directions from their common axis.

4 Claims, 7 Drawing Figures

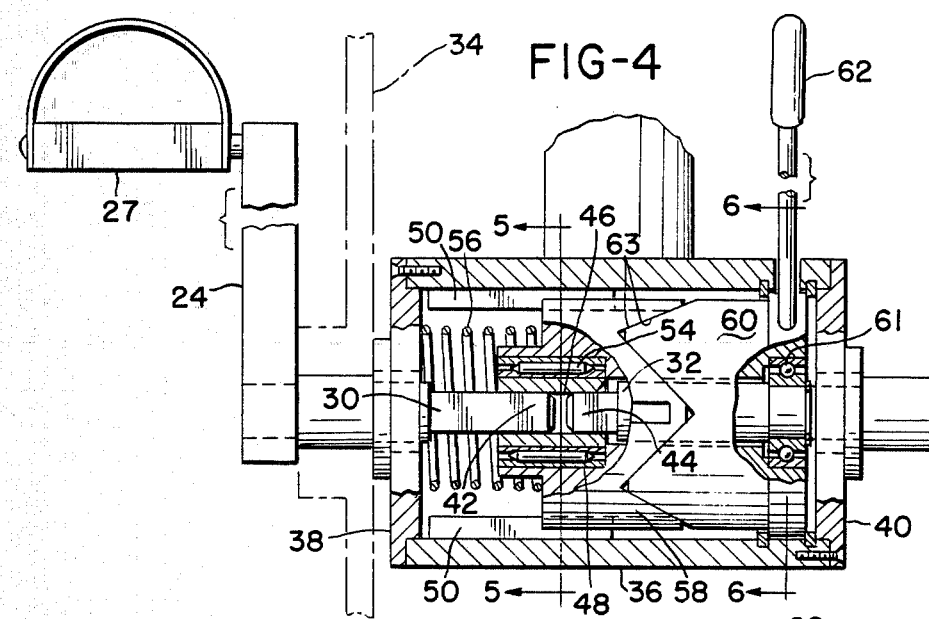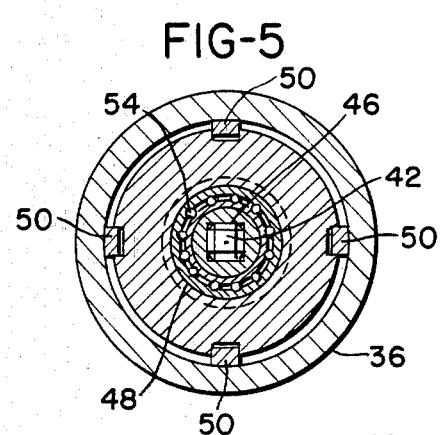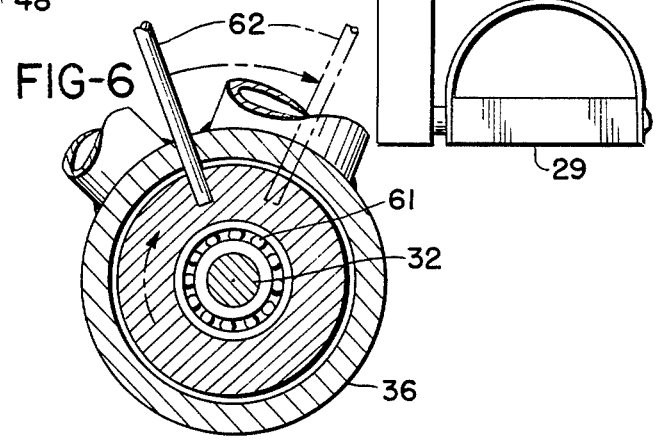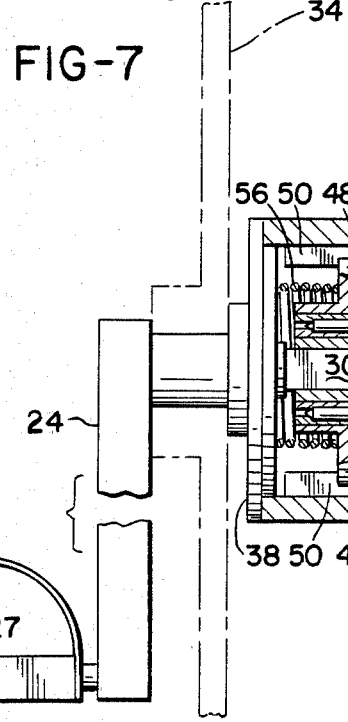

BICYCLE TYPE EXERCISE APPARATUS WITH INDEXING PEDAL CRANKS

BACKGROUND OF THE INVENTION

The present invention relates generally to exercise apparatus, and particularly to exercise apparatus wherein a bicycle-type frame supports a seated operator or user who pedals in a manner generally similar to the pedaling of a conventional bicycle. In such conventional apparatus, the crank arms, like those of a conventional bicycle, extend in opposite directions from a common geometric axis and are fixed to a sprocket rotatable about the same axis. The sprocket is often or typically coupled by a chain drive to a wheel positioned in front of the operator, and the wheel is provided with a snubbing apparatus which is adjustable to selectively vary the degree of resistance to movement.

Such conventional exercise apparatus is limited in the exercise benefits attained, because of the geometric relationship between the pedal crank arms. It has been found that substantial exercise benefits may be achieved by changing the angular relationship between the crank arms. It has been found that, if the crank arms which support the respective pedals are disposed so that they extend in exactly the same angular direction from a single geometric axis substantial benefits are achieved in terms of attaining exercise which would not otherwise be possible. For convenience in describing this geometic relationship the term "side by side" will be used to characterize the relationship of the crank arms when they extend in a single direction from their geometric axis. With the side by side relationship of the crank arms, the legs of the user move synchronously as the respective pedals are moved through their 360 degree travel.

The prior art includes the apparatus described in U.S. Pat. No. 3,485,495. That U.S. patent shows crank arms which are disposed in side by side relationship rather than the opposed relationship common to conventional bicycle type exercisers. Changing the relative positions of the crank arms in the apparatus of this patent involves difficulty, work and inconvenience, so that it has not had wide adoption.

It is an object of the invention to provide bicycle-type exercise apparatus in which the respective pedal crank arms may be easily indexed relative to each other to position the crank arms either in side by side relationship or opposed relationship.

It is another object of the invention to provide such apparatus which allows the user to selectively index the respective crank arms without tools and while seated on the apparatus.

SUMMARY OF THE INVENTION

The foregoing objects and other objects and advantages which shall become apparent from the detailed description of the preferred embodiment are attained in exercise apparatus which includes a frame, pedaling apparatus carried on the frame, a first crank arm carrying a pedal and fixed to a first shaft rotatably mounted on the frame, and a second crank arm carrying a second pedal fixed to a second shaft rotatably mounted on the frame. The first and second shafts have a common axis. Means are provided for the selective angular indexing of the first crank arm relative to a second crank arm, between positions or angular orientations, including at least a first position wherein the first and second crank arms are disposed in the same angular orientation, and a second position wherein the crank arms extend in substantially opposite directions from their common axis.

The indexing arrangement includes a clutch mechanism which has mutually engagable confronting jaw elements, each of which jaw elements is associated with one of the shafts. Each of the confronting jaw elements preferably has at least one face oblique to the axis. The indexing arrangement preferably includes a cage which is movable axially relative to the shafts, between a first position wherein the cage engages both shafts to prevent relative rotation therebetween, and a second position wherein only one shaft is engaged by the cage to allow relative rotational movement. Lever means are preferably provided for urging the cage between positions. The cage is preferably axially biased to the first position by a spring, with the lever being arranged to allow override of the spring.

BRIEF DESCRIPTION OF THE ACCOMPANYING DRAWING

FIG. 4 is a sectional view taken along the line 4—4 of FIG. 1.

FIG. 5 is a sectional view taken along the line 5—5 of FIG. 4.

FIG. 6 is a sectional view taken along the line 6—6 of FIG. 4; and

FIG. 7 is another sectional view, similar to FIG. 4, which illustrates another position of the clutch mechanism.

DESCRIPTION OF THE PREFERRED EMBODIMENT

Figure 1:
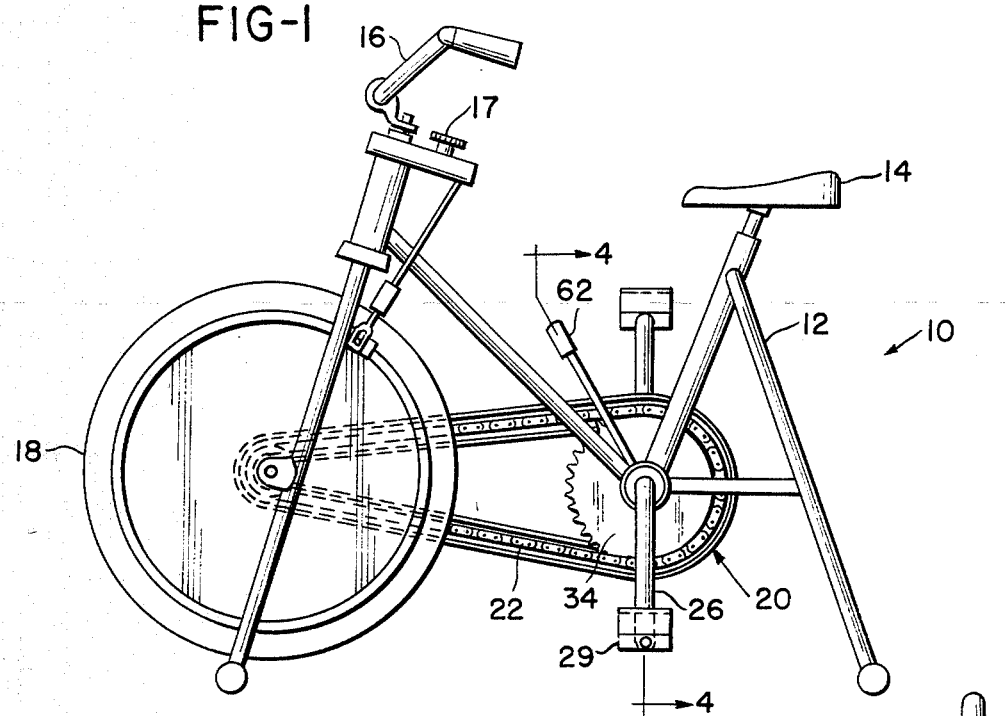
FIG. 1 is a side elevational view of the apparatus in accordance with one form of the invention.
Figure 2:
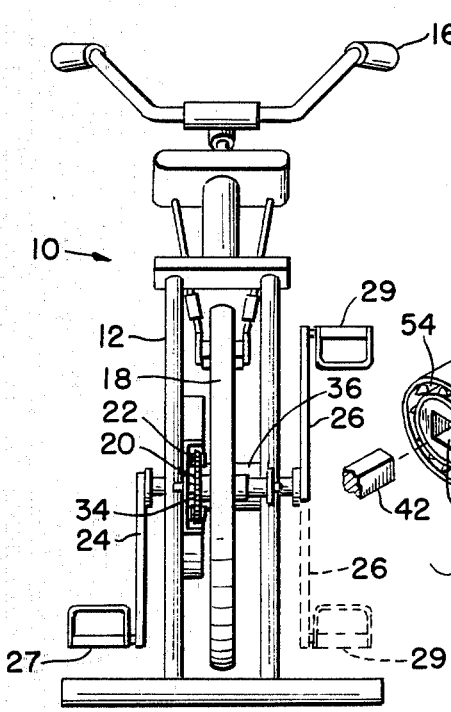
FIG. 2 is a front elevational view of the apparatus illustrated in FIG. 1.
Figure 3:
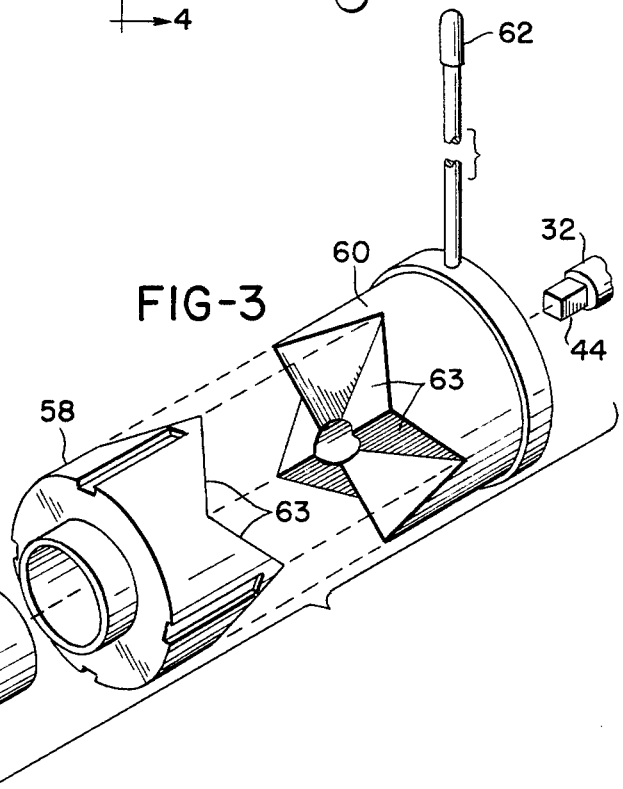
FIG. 3 is a perspective view of the clutch assembly utilized in the apparatus of FIGS. 1 and 2, illustrated in exploded relationship.

Referring now to FIGS. 1–7, there is shown an exercise apparatus 10 having a frame 12, which supports a seat 14 and stationary handle bars 16. The apparatus includes a pedal resistance control and snubbing apparatus 17. Mounted for rotation with respect to the frame 12 are a wheel 18 and a pedal and sprocket assembly 20.

The pedal and sprocket assembly 20 is connected by a chain 22 to the wheel 18. The pedal and sprocket assembly 20 includes crank arms 24, 26, which are shown in their conventional opposed position in FIGS. 1, 2, and 4. The apparatus in accordance with the invention allows selective movement of the crank arms 24, 26 to a side by side position, such as that illustrated by a solid line in FIG. 7. In other forms of the invention still other relative angular positions between the crank arms 24, 26 may be attained.

The pedal and sprocket assembly 20 also includes shafts 30, 32 which are respectively fixed to crank arms 24, 26. Carried on the respective crank arms 24, 26 are pedals 27, 29. The shaft 30 is fixed to a sprocket wheel 34 and extends into a housing defined by a cylindrical sleeve 36 and end caps 38, 40. It will be understood that the shaft 32 is rotatable relative to an element 60 of a jaw clutch to be described hereinafter. Inner axial extremities 42, 44 of the respective shafts 30, 32 have square cross-sections which are dimensioned for sliding engagement with a bore 46 of a cage or coupling element 48. The cage 48 is carried within the cylindrical sleeve 36 and is engaged by a jaw clutch element 58, which is constrained to move only in an axial direction within the cylindrical sleeve 36 by axially extending ribs 50, 50, 50, 50.

The cage 48 is moveable between the position illustrated in FIG. 4 wherein the bore 46 engages both axial extremities 42, 44 of the respective shafts 30, 32 and a second position illustrated in FIG. 7. In the second position the cage 48 is axially displaced to the left, as shown, to disengage the bore 46 thereof from the axial extremity 44 of the shaft 32. In this second position, the crank arm 26 may be indexed to a side by side position of the crank arms 24, 26, as shown in solid lines of FIG. 7, instead of the conventional opposed relationship. The opposed position of the crank arms 24, 26 is shown in dotted lines in FIG. 7. It will be understood that in the embodiment illustrated the crank arm 26 may also be positioned at two other angular positions since the axial extremity 44 of the shaft 32 is square and the bore 46 of the cage 48 is also square. Thus, there are four possible relative positions of the cage 48 and the shaft 32. In the preferred embodiment, the cage 48 includes needle bearings 54 intermediate the inner sleeve in which the bore 46 is located and an outer sleeve, which is configured for engagement with the element 58 of the jaw clutch. The purpose of the needle bearings 54 is to support the shafts 30, 32 as they rotate, and to reduce friction.

The cage 48 is biased to the right as shown by a spring 56, as best seen in FIG. 4. The cage 48 is selectively urged to the left by a jaw clutch having a first element 58 and a second element 60. Each of these elements 58, 60 has faces 63, which are disposed in oblique relationship to the common axis of the elements 58, 60. As described previously, the leftmost element 58 engages the ribs 50, 50 on the interior of the sleeve 36 of the housing and is thus constrained so that it can only move axially with respect to the geometric axis of the pedal and sprocket assembly 20. The rightmost element 60 of the jaw clutch is moveable relative to the housing by a lever 62 fixed to the element 60. A ball bearing assembly 61 is disposed intermediate the shaft 32 and the element 60. In operation, an operator will rotate the element 60 about its geometric axis, as best shown by the solid and phantom line positions of the lever 62 illustrated in FIG. 6, which causes the oblique faces 63, 63 of the elements 58, 60 of the jaw clutch to engage. The leftmost element 58 will accordingly be displaced axially to the left and will in turn displace the cage 48 to the left to the position shown in FIG. 7.

It will be appreciated and understood that the apparatus allows the user to change the relative positions of the crank arms 24, 26, thus to obtain beneficial execise effects wherein the legs are moved synchronously, and that the adjustment of the relative position of the crank arms 24, 26 may be easily accomplished.

The invention has been described with reference to its illustrated preferred embodiment. Persons skilled in the art of constructing exercise equipment may, upon exposure to the teachings herein, conceive variations in the mechanical development of the components therein. In some embodiments the axial extremities 42, 44 of the shafts 30, 32 and the cooperating bore 46 may be changed. For example, each may be hexagonal to permit a still wider variation in relative angular positions of the crank arms 24, 26. The lever 62 may be replaced in various embodiments by a Bowden cable, such as that used on ten-speed bicycles to control shifting operations and brake apparatus. Various other mechanisms will be apparent to those skilled in the art for producing the axial movement of the cage 48, other than the jaw clutch faces 63, 63, which have been illustrated. Similarly, various other forms of the invention may utilize a coupling element which is functionally equivalent to the cage 48 shown herein. Such variations are deemed to be encompassed by the disclosure, the invention being delimited only by the appended claims.

The invention claims:

1. Exercise apparatus which comprises:
   a frame,
   apparatus for pedalling carried on said frame,
   said apparatus for pedalling including a first pedal carried on a first crank arm fixed to a first shaft, means rotatably mounting said first shaft on said frame, a second pedal mounted on a second crank arm fixed to a second shaft, means rotatably mounting said second shaft on the frame, said first and second shafts having a common axis, means for selective angular indexing of said first crank arm relative to said second crank arm between at least a first position wherein said first and second crank arms are disposed in the same angular orientation and a second position wherein said first and second crank arms respectively extend in substantially opposite directions from said common axis,
   said means for indexing comprises a clutch mechanism having mutually engageable confronting jaw elements, each jaw element being associated with one of said shafts, and
   each of the confronting jaw elements having at least one face oblique to said common axis.

2. Exercise apparatus according to claim 1, wherein:
   said indexing means includes a cage movable axially relative to said shafts between a first position wherein the cage engages both said first and said second shafts to prevent relative rotational movement of the shafts, and a second position wherein only one of the shafts is engaged by the cage to allow relative rotational movement between the shafts.

3. Exercise apparatus according to claim 2, further including:
   lever means for urging said cage from one position to another.

4. Exercise apparatus according to claim 3, further including:
   spring means to bias said cage axially to said first position, said lever being coupled to allow selective override of said spring means.

* * * * *